United States Patent [19]

Driggers

[11] Patent Number: 4,700,040
[45] Date of Patent: Oct. 13, 1987

[54] RADIANT BRAZING TEMPERATURE SENSING APPARATUS AND PROCESS

[75] Inventor: John M. Driggers, Pittsburgh, Pa.

[73] Assignee: Westinghouse Electric Corp., Pittsburgh, Pa.

[21] Appl. No.: 11,405

[22] Filed: Feb. 4, 1987

Related U.S. Application Data

[60] Continuation of Ser. No. 889,730, Jul. 28, 1986, abandoned, which is a division of Ser. No. 720,105, Apr. 4, 1985.

[51] Int. Cl.$^4$ .................................................. B23K 1/02
[52] U.S. Cl. .................................. 219/85 R; 219/85 D
[58] Field of Search ................ 219/85 R, 85 D, 60.2

[56] References Cited

U.S. PATENT DOCUMENTS

| | | | |
|---|---|---|---|
| 3,621,182 | 11/1971 | Peyrot | 219/60.2 |
| 3,754,115 | 8/1973 | Roberts et al. | 219/60.2 |
| 4,523,177 | 6/1985 | Driggers et al. | 338/303 |
| 4,572,938 | 2/1986 | Driggers et al. | 219/85 BM |
| 4,574,172 | 3/1986 | Burack et al. | 219/10.49 R |
| 4,580,028 | 4/1986 | Kobuck et al. | 219/85 R |

*Primary Examiner*—C. L. Albritton

[57] ABSTRACT

Both an apparatus and a process for accurately applying a correct amount of brazing heat to a conduit are disclosed herein. The apparatus generally comprises a mandrel including an electrical resistance wire heating element and a heat sensor for sensing the temperature of the inside walls of the conduit which were heated. The mandrel is preferably formed from a refractory material, and the heat sensor is located beneath the surface of the mandrel in order to insulate it from heat radiated from the electrical resistance wire wound about the mandrel body. The mandrel further includes an opening in the portion of the mandrel which surrounds the heat sensor in order that the sensor may be selectively exposed to a section of conduit to which heat was applied by sliding the mandrel to a position which aligns the opening with the wall of the heated conduit. The temperature of the conduit may then be determined as a function of the radiant heat received by the heat sensor. The invention is particularly useful in producing high quality braze joints between reinforcing sleeves inserted within damaged heat exchange tubes of a nuclear steam generator since the heat sensor allows the operator to determine whether or not a proper amount of brazing heat was applied to the sleeve/tube configuration.

6 Claims, 10 Drawing Figures

RADIANT BRAZING TEMPERATURE SENSING APPARATUS AND PROCESS

This application is a continuation of application Ser. No. 06/889,730 filed July 28, 1986, now abondoned, which is a division of application Ser. No. 06/720,105 filed Apr. 4, 1985, now abandoned.

BACKGROUND OF THE INVENTION

1. Field of the Invention

This invention relates to a radiant brazing apparatus and process wherein the heater assembly includes a sensor for rapidly measuring the temperature of the section of the conduit to which heat was applied.

2. Description of the Prior Art

Devices and processes for applying a brazing heat to the inside surfaces of conduits are known in the prior art. Such processes are used to braze reinforcing sleeves within the heat exchange tubes of nuclear steam generators. In such prior art processes, a tubular sleeve which is circumscribed at each end by a ring of brazing alloy is inserted into a tube in need of repair and slidably positioned across the section of the tube where the walls are in a damaged condition due to corrosion or denting. The ends of the tube surrounded by the rings of brazing alloy are then usually hydraulically expanded so that they snugly engage the inner walls of the tube. To complete the joint, a heater assembly formed from an electrical resistance wire coiled around a mandrel is slid up the sleeve and actuated so that the heat generated by the wire melts the rings of brazing alloy disposed between the outer wall of the sleeve and the inner wall of the tube, thereby forming a pair of watertight braze joints between the ends of the sleeve and the tube. Such prior art sleeving operations are frequently performed in the longitudinal sections of the heat exchange tubes which extend through the tubesheet of the nuclear steam generator due to the tendency of the walls of these tubes to corrode and dent in this region.

While the aforementioned one-step brazing process frequently resulted in watertight braze joints, problems sometimes arose when sludge deposits became tightly wedged in the annular space between the walls of these tubes and the bores or other openings in the tubesheets and support plates through which these tubes extended. Under such circumstances, the sludge deposits sometimes bound the outer walls of the tube so tightly against the walls of the bores and the tubesheets and support plates that the tubes were prevented from thermally expanding along their longitudinal axis when the electrical resistance coil of the heater assembly applied a brazing heat to the tube and the sleeve. Consequently, some of these tubes expanded radially rather than longitudinally in the area where brazing heat was applied. Such a radial expansion in the area of the braze joint sometimes created undesirable gaps in the joint which jeopardized the integrity of the watertight seal the braze joint was intended to produce. The extent to which such undesirable gapping occurred would, of course, vary widely between any group of sleeve tubes due to the varying amount of binding forces the sludge deposits applied to these tubes when a brazing heat caused them to thermally expand. However, in those tubes where sludge deposits applied a substantial amount of resistance to the longitudinal tube expansions, the amount of gapping which occurred significantly jeopardized the ability of the braze joint to create a watertight seal.

In order to overcome the shortcomings of such one-step brazing processes in consistently creating watertight braze joints, a two-step process was developed which is specifically described and claimed in U.S. patent application Ser. No. 634,336, filed July 13, 1984, invented by John M. Driggers and assigned to Westinghouse Electric Corporation. In the first step of this process, the heater assembly is slid along the longitudinal axis of the tube being repaired to a region which is close to, but which does not include, the region of the sleeve and tube where the ring of brazing alloy is situated. The electrical resistance coil of the heater assembly is then actuated. In tubes where the binding forces will not allow the tube to longitudinally expand in response to heat, the heater assembly will thermally create a radial expansion in the region of the tube adjacent the electrical resistance coil. In the second step of the process, the heater assembly is slid up the sleeve to a position where the electrical resistance coil of the heater assembly is adjacent the ring of brazing material which circumscribes the reinforcing sleeve, while electrical power continues to flow through the coil. The residual tensile stress created by the first, thermally induced radial expansion in the tube avoids the creation of gaps in the braze joint between the sleeve and inner walls of the tube. This process has been particularly effective in creating high-quality braze joints and sleeving operations in nuclear steam generators.

Unfortunately, while this two-step brazing process constitutes a substantial advance in the art over the one-step process in creating high quality gapless braze joints, proper execution of this process is sometimes difficult due to the wide variation in the heat-sink properties of the particular sleeve/tube combination being brazed. A principal cause of these heat-sink variations is the amount of dark colored oxides on the outside walls of the tube being brazed; the presence of a layer of such dark oxides over the outer walls of the tube can greatly increase the radiat heat losses out of the sleeve/tube combination due to the phenomenon of black-body radiation: Other causes of heat-sink variations include the amount and type of corrosion between the tube and the tubesheet (some oxides are fairly good heat conductors), as well as the amount of water surrounding the tube being brazed. These variations make it difficult to consistently apply the proper amount of heat to the tube so that the heater assembly induces the required amount of thermal radial expansion in the first step of the process, and then proceeds to properly fuse the brazing alloy in the second step so that the desired high-quality joint is created. While both the one-step and two-step processes can, for the most part, be effectively executed by actuating the resistance coil of the heater assembly at a power level and for an amount of time selected on the basis of the "average" heat-sink properties of such sleeve/tube combinations, variations in these properties can occasionally result in the application of an insufficient or excessive amount of heat to the joint. Either extreme can, of course, jeopardize the integrity of the resulting joint.

Clearly, there is a need for some means for determining whether or not the proper amount of heat has been applied to a particular sleeve/tube combination in order to create a high-quality braze joint. Ideally, such a sensor should be mounted on or near the heater mandrel, and capable of quickly and accurately determining the temperature of the section of the sleeve heated.

SUMMARY OF THE INVENTION

In its broadest sense, the invention is both an apparatus and a process for measuring the temperature of a conduit (such as a reinforcing sleeve in the heat exchange tube of a nuclear steam generator) which has been heated by a radiant heater assembly which comprises a mandrel having a heating element and a heat sensor. The heater assembly includes a means for thermally insulating the heat sensor from the heating element of the mandrel, and a means for selectively thermally coupling the sensor with the inside surface of the conduit being heated. The mandrel is preferably fabricated from a heat-insulating refractory material, such as boron nitride, and the heat sensor may be mounted beneath the outside surface of the mandrel so that a portion of the mandrel insulates the heat sensor from heat and infrared radiation radiated from the heating element. Additionally, the means for thermally coupling the heat sensor with the inside surface of the conduit may include an opening in the mandrel for selectively exposing the sensor to heat radiated from the conduit, as well as a means for sliding the heat source along the longitudinal axis of the conduit in order that this opening in the mandrel may be intermittantly exposed to the heated section of the conduit.

The heat sensor of the invention may include a high termperature tolerant quartz fiber which is optically connected to a pyrometer, and the mandrel may include a substantially longitudinally disposed bore for housing this fiber. Moreover, the opening which allows the fiber to be thermally coupled with the conduit may include a radially disposed, tapered opening which communicates with the longitudinal bore which houses the fiber. The mandrel of the heat source is preferably elongated, and may include a generally cylindrical central portion which is flanked on either side by leading and trailing enlarged shoulders. The heating element may include a coil of electrical resistance wire wound around the centrally disposed cylindrical portion of the mandrel, and the quartz fiber which forms part of the heat sensor may be disposed in a longitudinal housing bore located within the trailing shoulder of the mandrel. Preferably, the spacing between the radially disposed opening and the electrical resistance coil is chosen so that, if the heater assembly is employed in the aforementioned two-step brazing process, the quartz fiber will be exposed to heat radiated from the first heated section of the sleeve while the electrical resistance coil proceeds to apply brazing heat to the section of the sleeve containing the ring of brazing alloy. Such spacing allows the heat sensor of the heater assembly to conveniently confirm whether or not sufficient heat was applied to the first section of the sleeve/tube combination to cause a sufficient amount of stress-relieving, thermal radial expansion to occur in a tube which has been bound, by corrosion, from thermally expanding along its longitudinal axis. Additionally, the quartz fiber may be sheathed at least in part by a tubular structure which protects and aligns the delicate quartz fiber during the assembly or disassembly of the heater assembly, and prevents particles of boron nitride from collecting on the optical surfaces of the fiber.

In the process of the invention, the heating element of the mandrel is placed in the vicinity of the longitudinal section of the sleeve/tube combination to be heated. The heating element is then energized for a selected amount of time in order to raise the temperature of the selected section of the sleeve-tube combination. After expiration of this selected amount of time, the mandrel is slid into a different position along the longitudinal axis of the sleeve so that the radially disposed opening in the trailing shoulder of the mandrel is exposed to heat radiated from the walls of the selected section of sleeve, while the heating element of the mandrel proceeds to heat a longitudinal section of the sleeve which may include a ring of brazing alloy. The temperature of the selected section of sleeve is then instantaneously determined on the basis of the amount of heat received by the pyrometer through the quartz fiber in the opening in the mandrel, and the heating element of the mandrel is either maintained in its new position in order to fuse the ring of brazing alloy into a braze joint, or is replaced back into its initial position, depending upon whether the heater assembly heated the first section of the sleeve/tube combination to the desired minimum temperature. The provision of a high temperature tolerant quartz fiber in the mandrel allows the operator to quickly, accurately and positively confirm whether or not the correct amount of heat was applied to a particular sleeve/tube combination to create a high-quality braze joint.

DETAILED DESCRIPTION OF THE PREFERRED EMBODIMENT

Figures 1A, 1B:
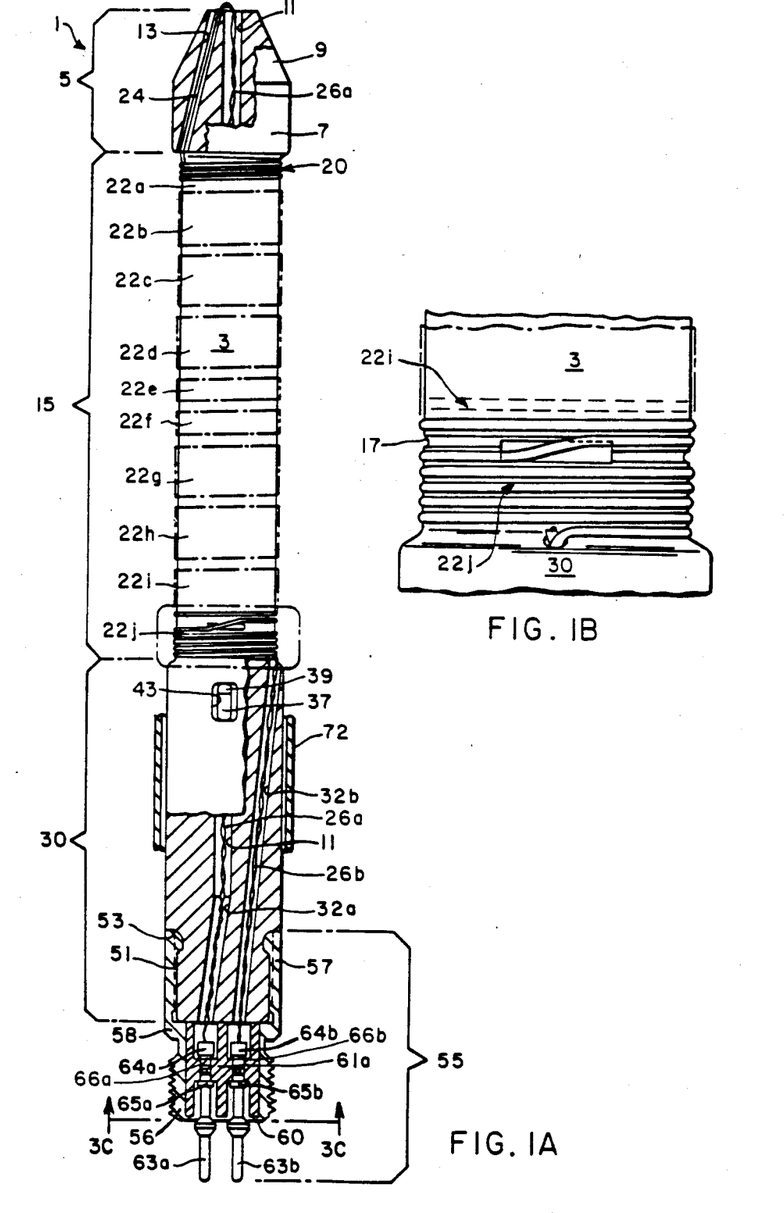
FIG. 1A is a partial, sectional side view of the heater assembly of the invention.
FIG. 1B is an enlarged view of the circled area in FIG. 1A.
Figures 2, 3A, 3B, 3C:
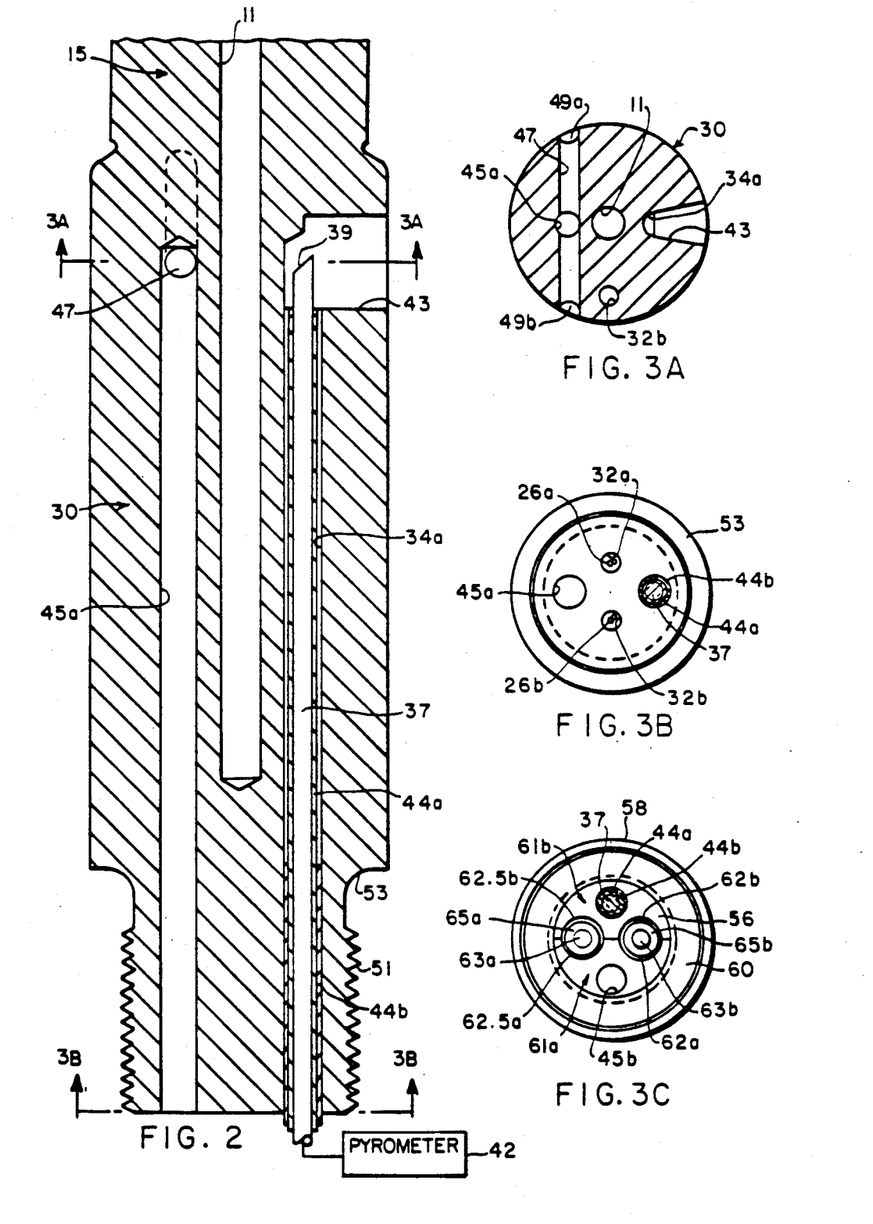
FIG. 2 is a cross-sectional side view of the trailing shoulder of the heater assembly of the invention rotated 90° from the position in which it is shown in FIG. 1A.
FIG. 3A is a cross-sectional view of the trailing shoulder of the heater assembly of the invention taken along line A—A in FIG. 2.
FIG. 3B is a cross-sectional view of the trailing shoulder of the heater assembly taken along line B—B of FIG. 2.
FIG. 3C is a cross-sectional view of the trailing shoulder of the heating assembly taken along line C—C of FIG. 1A.

With reference now to FIGS. 1A, 1B and 2, wherein like numerals refer to like components, the heater assembly 1 of the invention generally comprises a mandrel 3 formed from a heat-insulating refractory material, such as boron nitride, having a central portion 15 onto which a coil 20 of electrical resistance wire is wound. As will be described in more detail hereinafter, the mandrel 3 further includes an enlarged, trailing shoulder 30 having a bore 34 for housing a quartz fiber 37 which is optically connected to a pyrometer 42. A radially disposed, tapered opening 43 which communicates with the end of the housing bore 34 allows the quartz fiber 37 disposed therein to be selectively exposed to radiation from a heated section of either a tube or a sleeve. It should be noted at the outset that the mounting of the quartz fiber 37 within the insulating trailing shoulder 30 protects the fiber 37 from being overheated by the 3,000° F. temperatures generated at the surface of the coil 20. It should further be noted that the spacing between the radially disposed, tapered opening 43 and the heating coil 20 is proportioned so that the quartz fiber 37 may scan a first heated section of a sleeve/tube combination while the heating coil 20 proceeds to heat a different section of the sleeve/tube combination. Such spacing renders the heater assembly 1 of the invention particularly useful in implementing the two-step brazing process described and claimed in U.S. patent application Ser. No. 634,336, filed July 25, 1984, the entire specification of which is hereby expressly incorporated herein by reference.

Turning now to a more specific description of the heater assembly 1, the mandrel 3 further has an enlarged leading shoulder 5 having a cylindrical portion 7 which terminates in a frustro-conical end 9. Leading shoulder 5 includes both a centrally disposed bore 11 and a laterally disposed bore 13. Bore 11 accommodates braided lead wire 26a of the coil 20, while bore 13 houses wire 24 of this coil. Centrally disposed bore 11 does not terminate at the proximal end of the leading shoulder 5, but extends completely through the generally cylindrical body of the mandrel 3, and well into the trailing shoulder 30, where it connects with an angled bore 32a which houses braided lead wire bore 26a. As used herein, the words "proximal" and "distal" are used from the perspective of the operator, who manipulates the heater assembly by means of a nylon push-rod 69 connected to the lead wire end of the mandrel 3.

The mandrel 3 further includes a generally cylindrical central portion 15 disposed between the previously described leading shoulder 5, and a trailing shoulder 30. As is indicated in FIG. 1, the centrally disposed portion 15 of the mandrel 3 accommodates the windings of the heater coil 20. The provision of the enlarged shoulders 5 and 30 on either side of the smaller-diameter central portion 15 of the mandrel 3 serves three important functions. First, since these shoulders 5 and 30 are formed from a heat-insulating substance, the inner edges of these shoulders define fairly sharp limits in the longitudinal shape of the heating zone generated by the coil 20. This feature renders the heater assembly 1 particularly useful in carrying out the two-step brazing process described and claimed in previously mentioned patent application Ser. No. 634,336, since proper implementation of this process requires that the brazing heat be accurately applied along specific longitudinal sections of the sleeve. Secondly, these shoulders 5 and 30 help concentrically space the windings of the coil 20 from the inside walls of the sleeve or other conduit being brazed so that the coil applies uniform heat at all points along its diameter. Thirdly, these shoulders 5 and 30 prevent the windings of the coil 20 from inadvertently rubbing against the inner walls of the sleeve when the heater assembly is slid up and down the tube, which could bunch up the coil windings into a non-uniform configuration.

As may best be seen in FIG. 1B, the generally cylindrical central portion of the mandrel 3 includes a plurality of helically disposed grooves 17 disposed around its exterior surface. Each of these grooves 17 receives one of the windings of the heater coil 20. The function of these grooves 17 is to reinforce the function of the enlarged shoulders 5 and 30 in preventing the windings of the coil 20 from becoming bunched up or otherwise longitudinally displaced as a result of any incidental friction that the windings experience as the heater assembly 1 is slid through a sleeve/tube combination. Such bunching up of the coil windings could create short circuits in the coil 20, which in turn could form undesirable "hot spots" in the central portion 15 of the mandrel 3. Such "hot spots" could ultimately weaken the material forming the mandrel 3, and create non-uniformities in the pattern of heat flux generated by the coil 20. As a further precaution against the formation of such "hot spots", the coil 20 is preferably subdivided into a series of serially-connected coil sections 22a through 22j, each of which is separated from its neightbors by a small, heat-dissipating gap. Each coil section is preferably about 0.550 in. in diameter, which leaves a radial clearance of about 0.115 in. between the coil 20 and the sleeve 72.

At its distal end, the coil 20 terminates in the form of the aforementioned wire 24 which in turn becomes the previously mentioned braided lead wire 26a. At its proximal end, the last coil section 22j becomes a braided lead wire 26b. The use of braided lead wires 26a and 26b (each of which is formed from two wires twisted about 12 or 13 times per inch) is preferable over single-filament type lead wires due to their superior strength, reduced resistance heating and superior thermal characteristics. As will be described in more detail hereinafter, the braided lead wires 26a and 26b each ultimately extend out of the proximal end of the trailing shoulder 30, where they are connected to the pins of a connector assembly 55. The coil 20 is formed from a platinum-rhodium wire approximately 0.020 in. in diameter alloy which preferably includes 70% platinum and 30% rhodium; however, a platinum-rhodium alloy anywherein the range of 70% to 90% platinum and from 10% to 30% rhodium may also be used. The advantages associated with the use of braided lead wires, spaced coil sections, and platinum-rhodium alloy wire in the heating coil 20 are specifically set forth in U.S. patent applications Ser. Nos. 571,214 and 571,215, filed by John M. Driggers and John M. Driggers et al, respectively, on Jan. 16, 1984 and assigned to Westinghouse Electric Corporation. Both specifications are hereby expressly incorporated herein by reference.

The third major section of the mandrel 3 of the heater assembly 1 is the previously mentioned enlarged, generally cylindrical trailing shoulder 30. Shoulder 30 includes a pair of bores 32a and 32b for receiving the aforementioned braided lead wires 26a and 26b, respectively. As previously indicated, lead wire bore 32a communicates with the proximal end of the centrally disposed bore 11 which runs almost completely through the axis of rotation of the mandrel 3. Braided lead wire bore 32a is traversely disposed to the centrally disposed bore 11 at a small angle, as shown, in order to provide a sufficient amount of electrically insulating mandrel material between the two braided lead wire bores 32a and 32b so that short-circuiting does not inadvertently occur between the lead wires 26a and 26b housed therein.

As may best be seen with respect to FIG. 2, trailing shoulder 30 further includes a bore 34 for housing an optical fiber 37. In the preferred embodiment, the optical fiber 37 is a 0.6 mm single-strand quartz fiber having a tip 39 which is ground at a 45° angle in order to prismatically reflect the light along another optical fiber (not shown) which optically couples the fiber 37 to a two-color pyrometer 42. In the preferred embodiment, a Model No. R-25FO5-0-0-0-00-0-000 pyrometer, manufactured by Ircon, Inc., of Skokie, Ill., is used. The use of such a two-color pyrometer 42 is preferred for two reasons. First, such a pyrometer 42 is not light intensity-dependent. Therefore, any light intensity variations which occur due to clouding of the optical fiber 37 will not create temperature variations in the readings generated by the pyrometer 42. Second, such a pyrometer 42 provides an instantaneous readout of the temperature of the section of the sleeve which was heated. This is important, since this temperature tends to drop off quickly (as is graphically illustrated in FIG. 5). An optical system of the aforementioned model is capable of sensing temperatures in the range of between 1,300° F. to 2,500° F., while the heating coil 20 is capable of generating temperatures in reinforcing sleeves of up to about 2,400° F.

In order that the prismatic tip 39 of the quartz fiber 37 may be selectively exposed to heat radiated from the inside walls of the sleeve being brazed by the heater coil 20, trailing shoulder 30 of the heater assembly 1 further includes a radially disposed, tapered opening 43. This opening 43 is best seen with respect to FIG. 2, and FIG. 3A. As is evident from these figures, the tapered opening 43 communicates with the distal end of the fiber housing bore 34a in order to provide a window-like thermal waveguide from the outside surface of the trailing shoulder 30 to the prismatic tip 39 of the fiber 37. There are at least three advantages associated with the provision of a housing bore 34a and a tapered waveguide opening 43 in the trailing shoulder 30 of the mandrel 3. First, because the mandrel 3 is formed from a heat-insulating refractory material (such as boron nitride), the positioning of the fiber 37 beneath the surface of the mandrel 3 and away from the heating coil 20 allows the material forming the trailing shoulder 30 to effectively insulate the fiber 37 from the heat emanating directly from the coil 20. As previously mentioned, this is significant because the surface temperature of the coil sections 22a through 22j forming the heater coil 20 can become as high as 3,000° F., while the quartz fiber 37 can read and withstand temperatures to a maximum of only about 2,400° F. Secondly, such insulation, in combination with the directional selectivity afforded by the thermal waveguide opening 43, also insures that the prismatic tip 39 will only be exposed to heat radiated from the inside walls of the sleeve, rather than directly from the windings of the heater coil 20. Hence, placement of the fiber 37 within the trailing shoulder 30 not only preserves it from excessive heat, but also prevents it from optically transmitting erroneously high temperature readings from the windings of the coil 20. Thirdly, the longitudinal spacing between the heater coil 20 and the tapered waveguide opening 43 on the trailing shoulder 30 allows the prismatic tip 39 of the quartz fiber 37 to receive radiant heat from only a longitudinal section of the sleeve which has been heated by the heating coil 20, but which is not in the process of being directly exposed to it. This again enhances the accuracy of the invention, as the spacing of the opening 43 on the trailing shoulder 30 of the mandrel 3 will allow it to "see" only radiant heat generated by a heated longitudinal section of a sleeve subsequent to heating, and not radiant heat which is merely being reflected from the inside walls of the sleeve from the windings of the heater coil 20.

While the invention would be operable for a variety of longitudinal distances between the proximal end of the windings of the coil 20 and the center of the tapered opening 43, this longitudinal spacing is preferably selected so that, if the heater assembly 1 is used to effect the aforementioned two-step brazing process, the prismatic tip 39 of the quartz fiber 37 will be aligned with approximately the center of the first longitudinal section of the sleeve heated (relative to the longitudinal axis of the sleeve) when the heater assembly 1 has been repositioned so as to apply a brazing heat to a second longitudinal section of the sleeve/tube combination which includes the aforementioned ring of brazing material. Such longitudinal spacing between the proximal end of the windings of heater 20 and the center of the tapered opening 43 allows the operator to scan the first heated longitudinal section of the sleeve/tube combination while simultaneously fusing the ring of brazing alloy, thereby obviating the necessity of a separate "scanning" step whereby the fiber reads the temperature of the first heated longitudinal section while the heating coil 20 proceeds to heat the sleeve/tube combination along a section which does not consummate the desired braze joint.

With reference now to FIGS. 2, 3B and 3C, the quartz fiber 37 is preferably disposed within a tubular sheath 44a formed from a non-corrosive, heat-resistant material such a stainless steel. As is indicated in FIG. 3C, this tubular sheath 44a extends all the way through a bore 34b in one of the semi-cylindrical insulating pieces 61b of the connector assembly 55. From there, this sheath 44a extends about one-half inch away from the proximal end of the connector assembly 55, where it slidably engages a bore in a novel support mandrel (not shown), which is described and claimed in a concurrently filed U.S. patent application entitled "Improved Braze Heater Assembly", likewise invented by William E. Pirl and John M. Driggers and assigned to the Westinghouse Electric Corporation, the entire specification of which is expressly incorporated herein by reference. This sheath 44a helps align and protect the delicate quartz fiber 37 during both the assembly and disassembly of the heater assembly. As is best seen in FIGS. 2, 3B and 3C, sheath 44a is slidably disposed within a tubular alignment member 44b which extends between annular shoulder 53 in the trailing shoulder 30 of the heater mandrel 3, and the proximal end of bore 34b in semi-cylindrical insulating piece 61b. Tubular alignment member 44b helps to properly align the fiber housing bores 34a and 34b of the heater mandrel 3 and the semi-cylindrical piece 61b, respectively, during assembly of the heater assembly 1. Member 44b further prevents the fiber sheath 44a from scraping the walls of the bores 34a and 34b when the fiber 37 is inserted into the heater mandrel 3, which could cause light-blocking particles of boron nitride to collect on the prismatic tip 39 of the fiber 37.

With reference now to FIGS. 2, 3A and 3B, the trailing shoulder of the mandrel 3 also includes a longitudinally disposed gas bore 45 for conducting an air-purging flow of inert gas (preferably helium) around the body of the mandrel 3 surrounded by the heating coil 20 during the heating process. The provision of such a flow of inert gas has at least three advantages. First, it prevents the heat-insulating refractory material which forms the central portion 15 of the mandrel from reacting with ambient atmospheric oxygen during the brazing process, which in turn lengthens the useful lifespan of the mandrel 3. Second, when the coil 20 is energized, this flow helps conduct heat from the coil windings to the inner surface of the sleeve 87. Finally, when the coil 20 is de-energized, this flow helps cool off the heater mandrel 3, which in turn helps prevent the various components of the assembly 1 from overheating.

With specific reference now to FIGS. 2 and 3A, this longitudinally disposd gas bore 45 terminates at its distal end into the midpoint of a chordally oriented bore 47. Each of the ends of the bore 47 in turn terminates in short flutes 49a and 49b which longitudinally extend up the outer surface of the trailing shoulder 30 to the junction between the top of the shoulder 30 and the bottom of the heating coil 20. These flutes 49a and 49b coact with the inner surfaces of the reinforcing sleeve to advantageously divert the flow of inert gas from a lateral direction out of the ends of the chordally oriented bore 47 to a generally longitudinal direction, in order that the inert gas might effectively purge the ambient atmospheric gas surrounding the coil-holding central portion 15 of the mandrel 3. The trailing shoulder 30 of the mandrel 3 terminates in a threaded end portion 51 which is circumscribed by an annular shoulder 53 at its distal end for a purpose which will become evident presently. While the leading shoulder 5, the central portion 15, and the trailing shoulder 30 of the mandrel 3 are all integrally formed from a generally cylindrical piece of 99.9% pure boron nitride (which is preferably diffusion bonded), other refractory materials (such as zirconia and alumina) may also be used. However, the use of boron nitride is preferred due to the fact it is generally easier to machine and is believed to have better thermal shock resistant characteristics. Additionally, the coefficient of thermal expansion of boron nitride is compatible with the coefficient of thermal expansion of a heating coil formed from a platinum-rhodium alloy.

With reference again to FIG. 1, the threaded end portion 51 of the trailing shoulder 30 of the mandrel 3 is threadedly engaged to a connector assembly 55. The overall function of the connector assembly 55 is to form a solid mechanical and electrical connection between the braided lead wires 26a and 26b and electrical connector pins 63a and 63b. In the preferred embodiment, these terminal pins 63a and 63b are plugged into the receiver of the previously mentioned support mandrel (not shown). Connector assembly 55 generally includes an externally threaded housing member 56 having an internally threaded, cylindrical skirt 57 extending therefrom. The distal end of housing member 56 and the proximal end of the cylindrical skirt 57 are mutually connected through annular shoulder 58. Like skirt 57, the housing member 56 is essentially hollow, and includes a cylindrically shaped space 59 for housing a pair of semi-cylindrical insulating pieces 61a and 61b preferably formed from boron nitride. Additionally, the proximal end of the housing member 56 terminates in an annular capturing flange 60 which secures the semi-cylindrical pieces 61a, 61b within the housing member 56. In the preferred embodiment, the housing member 56, cylindrical skirt 57 and annular shoulder 58 are all integrally formed from No. 300 stainless steel due to its corrosion resistance and favorable machining characteristics.

As may best be seen with reference to FIGS. 1 and 3C, each of the aforementioned semi-cylindrical insulating pieces 61a and 61b includes a pair of parallel, semi-circular grooves 62a, 62.5a and 62b, 62.5b on its flat face for receiving the crimp contacts 64a and 64b of the terminal pins 63a and 63b, respectively. These grooves 62a, 62b and 62.5a, 62.5b are mutually registrable when the flat faces of the two semi-cylindrical insulating pieces 61a and 61b are abutted against one another to form a single, cylindrically shaped insulator member which is captured between the proximal end of the mandrel 3 and the capturing flange 60 of the housing member 56. When the two semi-cylindrical insulating pieces 61a and 61b are so positioned, the two pairs of semi-cylindrical bores 62a, 62b and 62.5a, 62.5b form the equivalent of two parallel bores which extend along the longitudinal axis of the mandrel 3. As is best seen in FIG. 1, each of these bores is recessed at its proximal and distal end in order to complement the shape of the pins 63a and 63b, each of which includes an upper stop shoulder 66a, 66b and a lower stop shoulder 65a, 65b.

These upper and lower stop shoulders 66a, 66b and 65a, 65b, respectively, serve to lock each of the pins 63a, 63b in the single, cylindrical insulator member formed when the flat sides of the two semi-cylindrical insulating pieces 61a and 61b are abutted together and captured within the cylindrical space inside the housing member 56. An electrical and mechanical connection is formed between each of the pins 63a and 63b and its corresponding braided lead wire 26a, 26b by inserting the lead wire within its respective crimp contact 64a, 64b, and squeezing the center of the crimp contacts with an appropriate crimping tool. In the preferred embodiment, each of the pins 63a, 63b (and their associated crimp contacts 64a, 64b) is formed from gold-plated copper. Additionally, after the crimp connection between the braided lead wires 26a and 26b and their respective pins 63a, 63b is made, the housing member 56 is preferably screwed onto the threaded end portion 51 of the trailing shoulder 30 in the position shown in FIG. 1 until the distal edge of the cylindrical skirt 57 abuts the annular shoulder 53 in the trailing mandrel shoulder 30, and the annular shoulder 58 firmly engages the proximal end of the shoulder 30. Such threaded engagement between the housing member 56 and the threaded end portion 51 of the trailing shoulder 30 of the mandrel 3 achieves two purposes. First, such positioning firmly secures the cylindrically shaped insulator formed from the two semi-cylindrical insulating pieces 61a, 61b between the capturing flange 60 and the proximal end of the mandrel 3. Secondly, such engagement serves to equilibrate any shear forces which the housing member 56 and cylindrical skirt 57 might apply onto the end of the trailing shoulder 30 of the mandrel 3 when the heater assembly 1 is pushed through various sections of a sleeve/tube combination. This force-equilibrating function is important, as the boron nitride from which the mandrel 3 is preferably formed tends to be brittle.

Figure 4A:
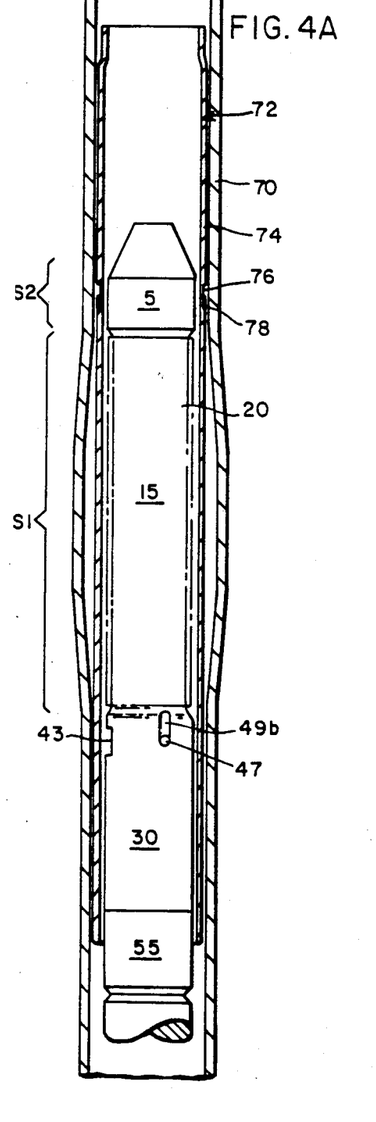
FIG. 4A illustrates the first step of the preferred embodiment of the process of the invention, wherein the heater assembly of FIG. 1 is used to thermally expand a first selected section of the sleeve/tube combination which does not include the ring of brazing alloy which circumscribes the upper portion of the sleeve.
Figure 4B:
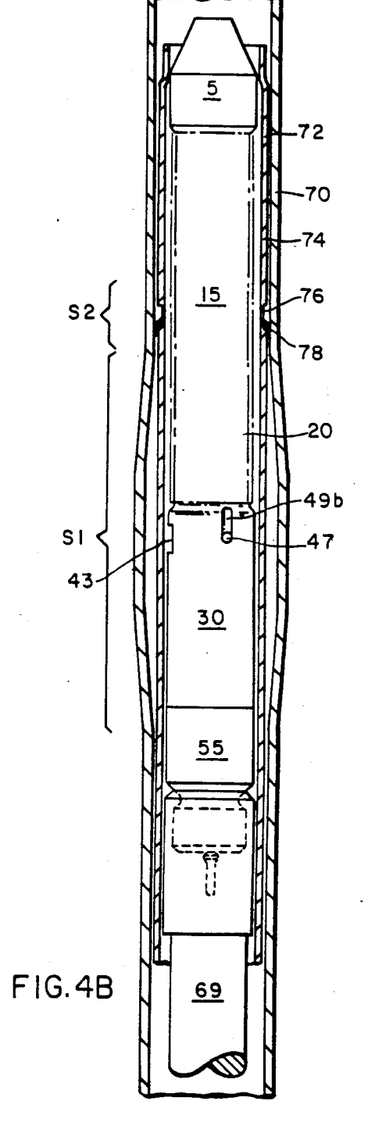
FIG. 4B illustrates the second step of this process, wherein the heater assembly is positioned so that the temperature sensor reads the temperature of the first heated section of the sleeve/tube combination while the heating element of this assembly simultaneously applies a brazing heat to a longitudinal section of this combination which includes the ring of brazing alloy which circumscribes the sleeve.
Figure 4C:
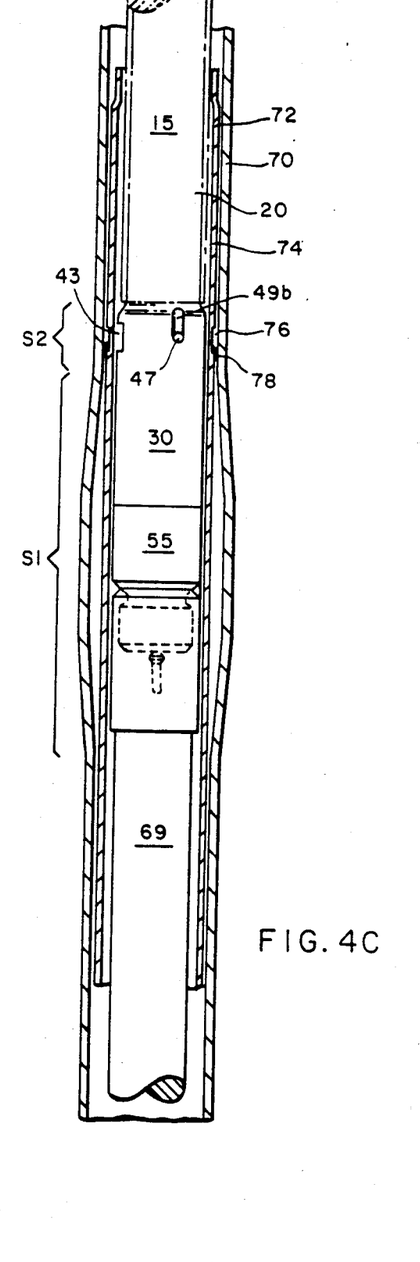
FIG. 4C illustrates the third step of this process, wherein the heater assembly is moved to a third position so that the temperature sensor located within its trailing shoulder reads the temperature of the section of the sleeve/tube combination to which a brazing heat was applied in order to confirm whether or not a correct amount of brazing heat was applied thereto.

FIGS. 4A, 4B and 4C illustrate the preferred process of the invention, wherein the heater assembly 1 is used to create a fluid-tight braze joint between an Inconel heat exchange tube 70 of the type used in nuclear steam generators, and an Inconel reinforcing sleeve 72 which is concentrically disposed within the inner walls of the tube 70. At the outset, it should be noted that such sleeves 72 are normally hydraulically expanded at both of their ends prior to the brazing process in order to provide a snug, frictional engagement between the ends of the sleeve 72 and the inside walls of the tube 70 being repaired. Such sleeves 72 normally also include a ring of brazing alloy around each of the expanded ends so that fluid-tight braze joints may be created at both ends of the resulting sleeve/tube combination after the brazing process has been completed. However, in order to avoid unnecessary prolixity, the detailed description of the preferred brazing process of the invention will be described only with respect to the manner in which the heating apparatus 1 is used to braze a joint between the distal or upper end of the sleeve 72 and the tube 70, it being understood that the same steps are also employed at the bottom or proximal end of the sleeve 72 and the tube 70.

In the first step of the process, a nylon positioning rod 69 is used to slidably position the heating coil 20 of the heater assembly 1 adjacent to a longitudinal section S1 of the sleeve/tube combination which is close to, but does not include, the section 52 of the sleeve 72 which includes the annular recess 76 or brazing reservoir where the aforementioned ring of brazing alloy 78 is located. Proper positioning of the heater assembly 1 may be carried out by either a traditional eddy current probe, or by using the heating coil 20 itself as an eddy current coil, as is specifically described and claimed in a concurrently filed U.S. patent application Ser. No. not yet assigned) entitled "Brazer Having a Dual Function Heating and Eddy Current Coil", by John M. Driggers, and assigned to Westinghouse Electric Corporation, the entire specification of which is hereby expressly incorporated herein by reference.

After the heater assembly 1 has been properly positioned by the nylon positioning rod 69 adjacent to section 52, the heating coil 20 is initially actuated for a time and at a power level thought to be sufficient to thermally expand the tube 70 surrounding the sleeve 72 along the londitudinal section S1. The initial times and power outputs used in implementing the first step of the brazing process are normally empirically derived quantities obtained by averaging the power levels and actuation times which effectively thermally expand the tube in the longitudinal region S1. While these times will vary with circumstances, the applicant has found that it takes a hold time of about three minutes when the coil 20 is operated at a power level of 1,000 watts in order to effect the desired tube expansion in a heat exchange tube formed from Inconel. If the tube 70 is so locked or bound between the tubesheets and support plates of the nuclear steam generator that the tube 70 is incapable of longitudinally expanding in response to the heat applied by the heater assembly 1, the tube 70 will radially expand along the longitudinal section S1 in the manner illustrated in FIG. 4A.

Figure 5:
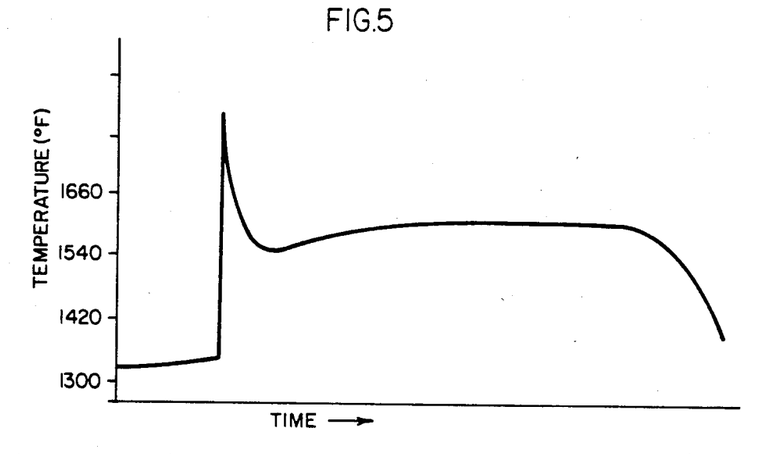
FIG. 5 is a graph illustrating the output signal of the fiber-optic monitoring system when the temperature sensor is scanned across a heated section of the sleeve/tube combination.

After the "average" time for effecting a thermal expansion in the tube in region S1 has expired, the operator then slides the heater assembly 1 further up into the sleeve/tube combination until the heater coil 20 is adjacent to longitudinal section S2 of the sleeve, as is illustrated in FIG. 4B. This movement has the consequence of aligning the radially disposed, tapered opening 43 leading to the tip 39 of the quartz fiber 37 with approximately the center of the section S1 of the sleeve which was heated in the first step of the brazing process. This results in a temperature scan as shown in FIG. 5, where the temperature peaks rapidly and then drops. The peak is due to the instantaneous reading of temperature at the heated section S1. As is evident from all of the several Figures, longitudinal section S2 of the sleeve/tube combination includes the annular recess 76 which acts as a reservoir for the ring of brazing alloy 78 which circumscribes the sleeve 72 at this point. While the heating coil 20 of the heater assembly 1 proceeds to heat the longitudinal section S2, the prismatic tip 39 of the quartz fiber 37 proceeds to transmit radiation from the heated walls of the sleeve 72 to the previously mentioned pyrometer. The peak temperature of the inside walls of the sleeve 72 in section S1 is then noted. This temperature is compared to an empirically derived minimum temperature to which the sleeve 72 must be heated in order to effectively thermally expand the tube surrounding the sleeve in section S1. If the temperature read is lower than this empirically derived temperature, the operator repositions the heater assembly 1 back into its initial position so that the heating coil 20 is placed back adjacent to the longitudinal section S1 of the sleeve/tube combination. The operator maintains the heater assembly 1 back in this position for a second, preselected amount of time which is usually (although not necessarily always) shorter than the initial amount of time the heater assembly 1 was maintained in this first position. Optionally, the power output of heating coil 20 may be increased. However, if the temperature read is at least as great as the minimum temperature associated with a desired amount of thermal expansion of the tube 70 surrounding the sleeve 72 along section S1, the operator maintains the heater assembly 1 at the second position so that the heating coil 20 continues to apply radiant heat to the longitudinal section S2 of the sleeve/tube combination. The operator maintains the heating assembly 1 at this second position for another empirically derived, selected amount of time which is normally sufficient to fuse the ring 78 of brazing alloy between the sleeve and the tube and create a high quality, fluid-tight braze joint between the tube 70 and the sleeve 72. While this second holding time will vary with circumstances, applicant has found that it normally runs about one and three-quarter minutes. In any case, the second holding time will normally always be shorter than the first since the thermal inertia of the heater mandrel 3 is overcome in the first holding time.

FIG. 4C represents the final step of the preferred process of the invention, wherein the operator slides the heater assembly 1 further up into the sleeve-tube combination so that the radially disposed, tapered opening 43 is aligned with approximately the center of the longitudinal section S2 of the sleeve 72 which includes the aforementioned ring 78 of brazing alloy. Again, the peak temperature of the inside walls of the section S2 of the sleeve 72 is read via the quartz fiber 37, and the pyrometer. If the peak temperature read is not at least equal to an empirically derived, minimum temperature associated with a sucessful braze joint, the operator pulls the heater assembly 1 back down into the second position adjacent to section S2. The heater assembly 1 is maintained in this position for a preselected amount of time, which is usually (but again, not always) shorter than the initial amount of time that the heating coil 20 was placed adjacent the section S2 of the sleeve 72. Again, if desired, the power output of the heating coil 20 may also be increased. However, if the temperature reading via the quartz fiber 37 indicates that the interior of the sleeve along longitudinal section S2 is equal to or greater than the desired minimum temperature, the heater assembly 1 is completely withdrawn from the sleeve/tube combination. In no case is the heater assembly removed until the temperature reading from the quartz fiber 37 indicates that the sleeve 72 has been heated to a sufficient temperaure in both longitudinal sections S1 and S2 to have successfully completed both the thermal expansion step, and the brazing step of the process. The repositioning of the heater assembly 1 adjacent to sections S1 and S2 is repeated as many times are necessary to achieve these desired minimum temperatures.

We claim as our invention:

1. A process for brazing a sleeve circumscribed by a ring of brazing material to the inside wall of a tube, comprising the sequential steps of:
   (a) applying heat across a first longitudinal section of said sleeve which does not include said ring of brazing material for a selected period of time in order to thermally expand the section of the tube surrounding this section of the sleeve, and
   (b) simultaneously measuring the temperature of the first longitudinal section of said sleeve while applying heat across a second longitudinal section of said sleeve which does include said ring of brazing material in order to create a braze joint between said sleeve and tube.

2. The process of claim 1, wherein said temperature is measured in a second selected period of time which is insufficient for the heat applied across the second longitudinal section of the sleeve to cause the melting of the ring of brazing material.

3. The process of claim 2, wherein steps (a) and (b) are repeated if the temperature measured indicates that the first section of sleeve was not heated to the extent necessary to effect a thermal expansion in the tube surrounding the sleeve.

4. The process of claim 3, further including the step of measuring the temperature of the second selected section of sleeve in order to confirm that enough heat was applied to this second section to cause the ring of brazing material to melt and form a braze joint between the sleeve and tube.

5. A process for brazing a sleeve circumscribed by a ring of brazing material to the inside walls of a tube with a heater assembly formed from an elongated mandrel havng a heating element in the form of an electrical resistance wire coiled about the central section of the mandrel, a heat sensor for determining the temperature of a longitudinal section of the sleeve exposed to the heating element, means for insulating the heat sensor from the heat radiated from the heating element, and means for placing the heat sensor in thermal communication with the selected heated section of the sleeve including an opening in the insulator means for exposing the heat sensor to heat radiated by the selected heated section of the sleeve, wherein said opening and said heating element are sufficiently longitudinally spaced apart so that said heating element may apply heat to a second selected longitudinal section of the sleeve which is different from the first selected section of the sleeve when said opening is positioned, comprising the steps of:
   (a) positioning the heating element of the mandrel in the vicinity of a first selected section of said sleeve for a selected amount of time in order to thermally expand the section of the tube surrounding the first selected portion of the sleeve, wherein said first selected section of said sleeve does not include the ring of brazing material circumscribing said sleeve, and
   (b) simultaneously reading the temperature of the first heated section of the sleeve by aligning the opening of the insulator means with a portion of the first heated section of the sleeve while heating a second section of the sleeve which includes said ring of brazing material by positioning the heating element adjacent of the second section.

6. The process of claim 5, further including the step of reading the temperature of the second heated section of the sleeve by aligning the opening of the insulator means with a portion of the second heated section of the sleeve after said second heated section has been heated by the heating element for a selected amount of time.

* * * * *